United States Patent
Mishra et al.

(10) Patent No.: US 12,335,111 B1
(45) Date of Patent: Jun. 17, 2025

(54) MACHINE LEARNING-BASED PROCESSING ENTITY STATUS SYNCHRONIZATION

(71) Applicant: Dell Products L.P., Round Rock, TX (US)

(72) Inventors: Deepti Mishra, Hyderabad (IN); Boris Marton, Košice (SK)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 18/598,737

(22) Filed: Mar. 7, 2024

(51) Int. Cl.
| G06Q 20/40 | (2012.01) |
| G06F 18/2431 | (2023.01) |
| G06Q 20/10 | (2012.01) |
| H04L 41/16 | (2022.01) |
| H04L 41/5009 | (2022.01) |

(52) U.S. Cl.
CPC ...... *H04L 41/5009* (2013.01); *G06F 18/2431* (2023.01)

(58) Field of Classification Search
CPC . H04L 41/5009; H04L 41/16; G06F 18/2431; G06Q 20/40; G06Q 20/10
USPC ......................................... 709/224
See application file for complete search history.

(56) References Cited

U.S. PATENT DOCUMENTS

| 2023/0111652 A1* | 4/2023 | Zhu ...................... G06Q 20/405 705/44 |
| 2023/0196308 A1* | 6/2023 | Richter ................. G06Q 20/10 705/44 |
| 2023/0351392 A1* | 11/2023 | Costa ................. G06Q 20/4016 |

OTHER PUBLICATIONS

M. Grandini et al., "Metrics for Multi-Class Classification: An Overview," arXiv:2008.05756v1, Aug. 13, 2020, 17 pages.
V. Y. Kulkarni et al., "Random Forest Classifiers: A Survey and Future Research Directions," International Journal of Advanced Computing, vol. 36, No. 1, Apr. 2013, pp. 1144-1153.
B.-B. Yang et al., "On the Robust Splitting Criterion of Random Forest," IEEE International Conference on Data Mining (ICDM), Nov. 2019, 6 pages.
M. Comuzzi et al., "Establishing and Monitoring SLAs in complex Service Based Systems," IEEE International Conference on Web Services, Jul. 2009, 8 pages.

* cited by examiner

*Primary Examiner* — Jude Jean Gilles
(74) *Attorney, Agent, or Firm* — Ryan, Mason & Lewis, LLP

(57) ABSTRACT

An apparatus comprises at least one processing device configured to identify two or more entity-level statuses for a transaction characterizing entity-level processing of the transaction by two or more different entities involved in processing the transaction. The at least one processing device is also configured to generate a first data structure characterizing an identified combination of the entity-level statuses for the transaction, and to process, utilizing at least one machine learning model of a machine learning system, the first data structure to generate a second data structure characterizing whether the identified combination of the entity-level statuses for the transaction is a valid combination of entity-level statuses. The at least one processing device is further configured to perform, responsive to the second data structure characterizing that the identified combination of the entity-level statuses for the transaction is invalid, one or more actions to update at least one of the entity-level statuses.

20 Claims, 8 Drawing Sheets

400

| ORDER NUMBER | MERGE TYPE | ENTITY-LEVEL STATUS | | | | | HEALTH | EXPECTED STATUS |
|---|---|---|---|---|---|---|---|---|
| | | 1 | 2 | 3 | 4 | 5 | | |
| 12345 | ACCESSORY | MN | CMP | SN NOTIFICATION (8000) | SN ACK | CARRIER RECEIPT | Y | MN, CMP |

405

| ORDER NUMBER | MERGE TYPE | ENTITY-LEVEL STATUS | | | | | HEALTH | EXPECTED STATUS |
|---|---|---|---|---|---|---|---|---|
| | | 1 | 2 | 3 | 4 | 5 | | |
| 67890 | ACCESSORY | SC | SC | SN NOTIFICATION (8000) | SN ACK | CARRIER RECEIPT | N | MN, CMP |

PP: PRE-PRODUCTION
IP: IN-PRODUCTION
SC: SCAN COMPLETE
MN: MANIFESTED
IN: INVOICED
SN: SHIPMENT NOTIFICATION
TC: TRANSPORT COMPLETE

3000: ORDER ACKNOWLEDGED BY MANUFACTURING VENDOR
4000: STARTED PRODUCTION
8000: SHIPMENT NOTIFICATION FROM VENDOR
8050: ORDER HANDED OVER TO CARRIER

FIG. 4

MACHINE LEARNING-BASED PROCESSING ENTITY STATUS SYNCHRONIZATION

BACKGROUND

As the value and use of information continues to increase, individuals and businesses seek additional ways to process and store information. Information processing systems may be used to process, compile, store and communicate various types of information. Because technology and information processing needs and requirements vary between different users or applications, information processing systems may also vary (e.g., in what information is processed, how the information is processed, how much information is processed, stored, or communicated, how quickly and efficiently the information may be processed, stored, or communicated, etc.). Information processing systems may be configured as general purpose, or as special purpose configured for one or more specific users or use cases (e.g., financial transaction processing, airline reservations, enterprise data storage, global communications, etc.). Information processing systems may include a variety of hardware and software components that may be configured to process, store, and communicate information and may include one or more computer systems, data storage systems, and networking systems.

SUMMARY

Illustrative embodiments of the present disclosure provide techniques for machine learning-based processing entity status synchronization.

In one embodiment, an apparatus comprises at least one processing device comprising a processor coupled to a memory. The at least one processing device is configured to identify two or more entity-level statuses for a transaction, the two or more entity-level statuses characterizing entity-level processing of the transaction by two or more different entities involved in processing the transaction. The at least one processing device is also configured to generate a first data structure characterizing an identified combination of the two or more entity-level statuses for the transaction, and to process, utilizing at least one machine learning model of a machine learning system, the first data structure to generate a second data structure, the second data structure characterizing whether the identified combination of the two or more entity-level statuses for the transaction is a valid combination of entity-level statuses. The at least one processing device is further configured to perform, responsive to the second data structure characterizing that the identified combination of the two or more entity-level statuses for the transaction is invalid, one or more actions to update at least one of the two or more entity-level statuses.

These and other illustrative embodiments include, without limitation, methods, apparatus, networks, systems and processor-readable storage media.

BRIEF DESCRIPTION OF THE DRAWINGS

FIG. 4 shows tables of combinations of entity-level status information for different orders in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
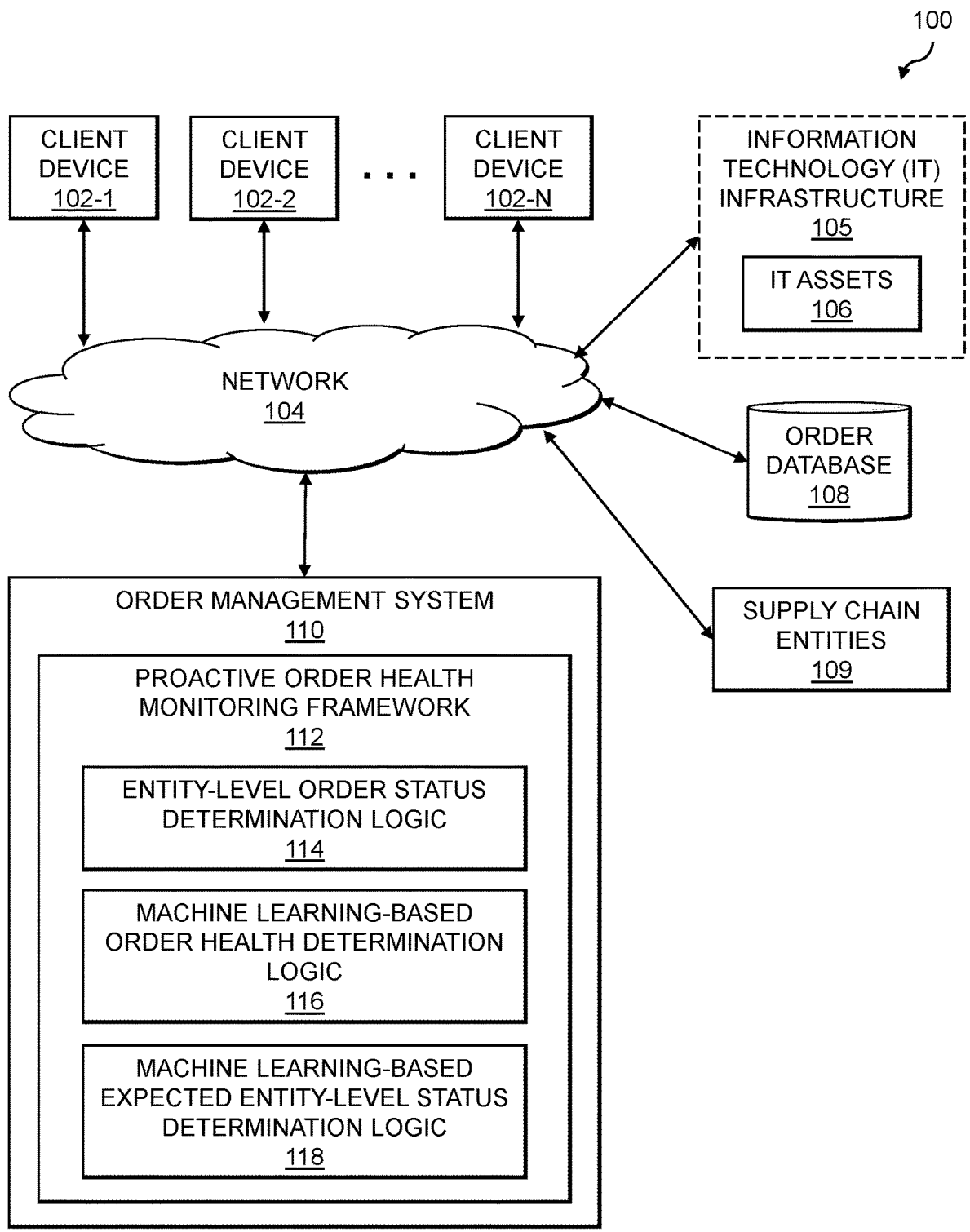
FIG. 1 is a block diagram of an information processing system configured for machine learning-based processing entity status synchronization in an illustrative embodiment.

FIG. 1 shows an information processing system 100 configured in accordance with an illustrative embodiment. The information processing system 100 is assumed to be built on at least one processing platform and provides functionality for machine learning-based processing entity status synchronization. As used herein, entity status "synchronization" refers to determining whether a combination of entity-level statuses provided by different entities associated with processing of an order or other transaction represents a valid or healthy combination of entity-level statuses. If a particular combination of entity-level statuses provided by the different entities associated with processing an order or other transaction is determined to be invalid or unhealthy, the synchronization may include taking actions to update one or more the entity-level statuses in order to achieve a healthy or valid combination of entity-level statuses for the order or other transaction. The information processing system 100 includes a set of client devices 102-1, 102-2, . . . 102-N (collectively, client devices 102) which are coupled to a network 104. Also coupled to the network 104 is an information technology (IT) infrastructure 105 comprising one or more IT assets 106, an order database 108, one or more supply chain entities 109, and an order management system 110. The order management system 110 may comprise, for example, a website or application that is accessed by users of the client devices 102 for managing orders (e.g., of products offered by an enterprise, organization or other entity operating the order management system 110, where the order management system 110 may be part of an e-commerce platform). The order management system 110 utilizes various entity-level information from different ones of the supply chain entities 109 (e.g., manufacturing facilities, logistics providers, carriers, IT applications) in order to determine an overall or order-level status for different orders. Although shown as external to the IT infrastructure 105 in FIG. 1, in some embodiments one or more of the supply chain entities 109 are implemented on or using one or more of the IT assets 106 of the IT infrastructure 105. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the order management system 110 is used for an enterprise system or other organization. For example, an enterprise or other organization may subscribe to or otherwise utilize the order management system 110 for managing orders relating to the products and services offered by that enterprise or other organization (where, in some cases, such products and services include the IT assets 106 of the IT infrastructure 105). Users of the enterprise or other organization associated with different ones of the client devices 102 may utilize the order management system 110 in order to manage problems or other issues which are encountered relating to orders. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The order database 108 is configured to store and record various information that is utilized by the order management system 110. Such information may include, for example, information associated with an active backlog of orders being processed by an enterprise or other organization, where such information for a given order may include entity-level statuses reported by different ones of the supply chain entities 109, an overall order-level status, etc. The order database 108 may also or alternatively store information related to valid and invalid combinations of entity-level statuses (e.g., corresponding to healthy and unhealthy orders), orders which are to be analyzed, etc. The order database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the order management system 110, as well as to support communication between the order management system 110 and other related systems and devices not explicitly shown.

The order management system 110 may be provided as a cloud service that is accessible by one or more of the client devices 102 to allow users thereof to manage orders placed with an enterprise or other organization. The client devices 102 may be configured to access or otherwise utilize the order management system 110 to track and manage order processing for different orders. In some embodiments, the client devices 102 are assumed to be associated with system administrators, IT managers, support engineers or other authorized personnel responsible for managing order processing. In other embodiments, the client devices 102 may be associated with end-users or customers which have placed orders with an enterprise or other organization. In some embodiments, the IT assets 106 of the IT infrastructure 105 and/or one or more of the supply chain entities 109 are owned or operated by the same enterprise that operates the order management system 110. In other embodiments, the IT assets 106 of the IT infrastructure 105 and/or one or more of the supply chain entities 109 may be owned or operated by one or more enterprises different than the enterprise which operates the order management system 110 (e.g., a first enterprise provides order support for multiple different customers, businesses, etc.). Various other examples are possible.

In some embodiments, the client devices 102, the IT assets 106 of the IT infrastructure 105 and/or the supply chain entities 109 may implement host agents that are configured for automated transmission of information with the order management system 110 (e.g., such as entity-level and order-level status information, information regarding expected entity-level statuses given an actual order-level status, information related to distressed or unhealthy orders, etc.). It should be noted that a "host agent" as this term is generally used herein may comprise an automated entity, such as a software entity running on a processing device. Accordingly, a host agent need not be a human entity.

The order management system 110 in the FIG. 1 embodiment is assumed to be implemented using at least one processing device. Each such processing device generally comprises at least one processor and an associated memory, and implements one or more functional modules or logic for controlling certain features of the order management system 110. In the FIG. 1 embodiment, the order management system 110 implements a proactive order health monitoring framework 112. The proactive order health monitoring framework 112 comprises entity-level order status determination logic 114, machine learning-based order health determination logic 116, and machine learning-based expected entity-level status determination logic 118. The proactive order health monitoring framework 112 is configured to obtain, from the order database 108, a list of an active backlog of orders being processing by a particular enterprise or other organization, with each of such orders having an overall order-level status. The entity-level order status determination logic 114 is configured to determine, for a given order, entity-level statuses reported by different ones of the supply chain entities 109 involved in processing the given order. The machine learning-based order health determination logic 116 is configured to utilize a machine learning system to determine whether the combination of entity-level statuses for a given order is a valid combination of entity-level statuses (e.g., whether the given order is "healthy" or not). If it is determined that the given order does not have a valid combination of entity-level statuses, the machine learning-based expected entity-level status determination logic 118 is configured to utilize a machine learning system (e.g., a multi-class classification machine learning model) to predict what the expected entity-level statuses for the given order should be. This information regarding the expected entity-level statuses for the given order may be used by the proactive order health monitoring framework 112 to trigger remedial action to correct any issues with the given order so as to avoid potential issues (e.g., before any service level agreements (SLAs) are violated).

At least portions of the proactive order health monitoring framework 112, the entity-level order status determination logic 114, the machine learning-based order health determination logic 116 and the machine learning-based expected entity-level status determination logic 118 may be implemented at least in part in the form of software that is stored in memory and executed by a processor.

It is to be appreciated that the particular arrangement of the client devices 102, the IT infrastructure 105, the order database 108, the supply chain entities 109 and the order management system 110 illustrated in the FIG. 1 embodiment is presented by way of example only, and alternative arrangements can be used in other embodiments. As discussed above, for example, the order management system 110 (or portions of components thereof, such as one or more of the proactive order health monitoring framework 112, the entity-level order status determination logic 114, the machine learning-based order health determination logic 116 and the machine learning-based expected entity-level status determination logic 118) may in some embodiments be implemented internal to one or more of the client devices 102 and/or the IT infrastructure 105.

The order management system 110 and other portions of the information processing system 100, as will be described in further detail below, may be part of cloud infrastructure.

The order management system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the order database 108, the supply chain entities 109 and the order management system 110 or components thereof (e.g., the proactive order health monitoring framework 112, the entity-level order status determination logic 114, the machine learning-based order health determination logic 116 and the machine learning-based expected entity-level status determination logic 118) may be implemented on respective distinct processing platforms, although numerous other arrangements are possible. For example, in some embodiments at least portions of the order management system 110 and one or more of the client devices 102, the IT infrastructure 105, the IT assets 106, the order database 108 and/or the supply chain entities 109 are implemented on the same processing platform. A given client device (e.g., 102-1) can therefore be implemented at least in part within at least one processing platform that implements at least a portion of the order management system 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the order database 108, the supply chain entities 109 and the order management system 110, or portions or components thereof, to reside in different data centers. Numerous other distributed implementations are possible. The order management system 110 can also be implemented in a distributed manner across multiple data centers.

Additional examples of processing platforms utilized to implement the order management system 110 and other components of the information processing system 100 in illustrative embodiments will be described in more detail below in conjunction with FIGS. 7 and 8.

It is to be understood that the particular set of elements shown in FIG. 1 for machine learning-based processing entity status synchronization is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for machine learning-based processing entity status synchronization will now be described in more detail with reference to the flow diagram of FIG. 2. It is to be understood that this particular process is only an example, and that additional or alternative processes for machine learning-based processing entity status synchronization may be used in other embodiments.

In this embodiment, the process includes steps 200 through 206. These steps are assumed to be performed by the order management system 110 utilizing the proactive order health monitoring framework 112, the entity-level order status determination logic 114, the machine learning-based order health determination logic 116 and the machine learning-based expected entity-level status determination logic 118. The process begins with step 200, identifying two or more entity-level statuses for a transaction, the two or more entity-level statuses characterizing entity-level processing of the transaction by two or more different entities involved in processing the transaction. The two or more different entities involved in processing the transaction may be associated with different supply chain entities in a supply chain. In some embodiments, the transaction comprises an order for one or more IT products, and the two or more different entities involved in processing the transaction may comprise at least two of: one or more manufacturing facilities; one or more product assemblers; one or more logistic providers; and one or more carriers. The two or more different entities involved in processing the transaction may comprise (i) a first set of one or more IT applications operated by a first one of the two or more different entities involved in processing the transaction and (ii) one or more additional IT applications operated by one or more additional ones of the two or more different entities involved in processing the transaction which report entity-level status information to the first set of one or more IT applications.

In step 202, a first data structure characterizing an identified combination of the two or more entity-level statuses for the transaction is generated.

In step 204, the first data structure is processed utilizing at least one machine learning model of a machine learning system to generate a second data structure, the second data structure characterizing whether the identified combination of the two or more entity-level statuses for the transaction is a valid combination of entity-level statuses. The at least one machine learning model of the machine learning system comprises a binary classification model, such as a Random Forest classifier. Processing the first data structure to generate the second data structure utilizing the at least one machine learning model of the machine learning system may comprise generating an expected combination of the two or more entity-level statuses for the transaction based at least in part on one or more characteristics of the transaction, the second data structure indicating whether the expected combination of the two or more entity-level statuses for the transaction matches the identified combination of the two or more entity-level statuses for the transaction. The one or more characteristics of the transaction may comprise an overall status level for the transaction and a transaction type of the transaction.

It should be noted that the term "data structure" as used herein is intended to be broadly construed. A data structure, such as any single one of or combination of the first and second data structures referred to above, may provide a portion of a larger data structure, or any one of or combination of the first and second data structures may be combinations of multiple smaller data structures. Therefore, the first and second data structures referred to above may be different parts of a same overall data structure, or one or more of the first and second data structures could be made up of multiple smaller data structures. The data structures may include tables, vectors, embeddings, or various other data structures. In some embodiments, the data structures are specifically formatted or generated such that they are suitable for use as input to machine learning models.

Figure 2:
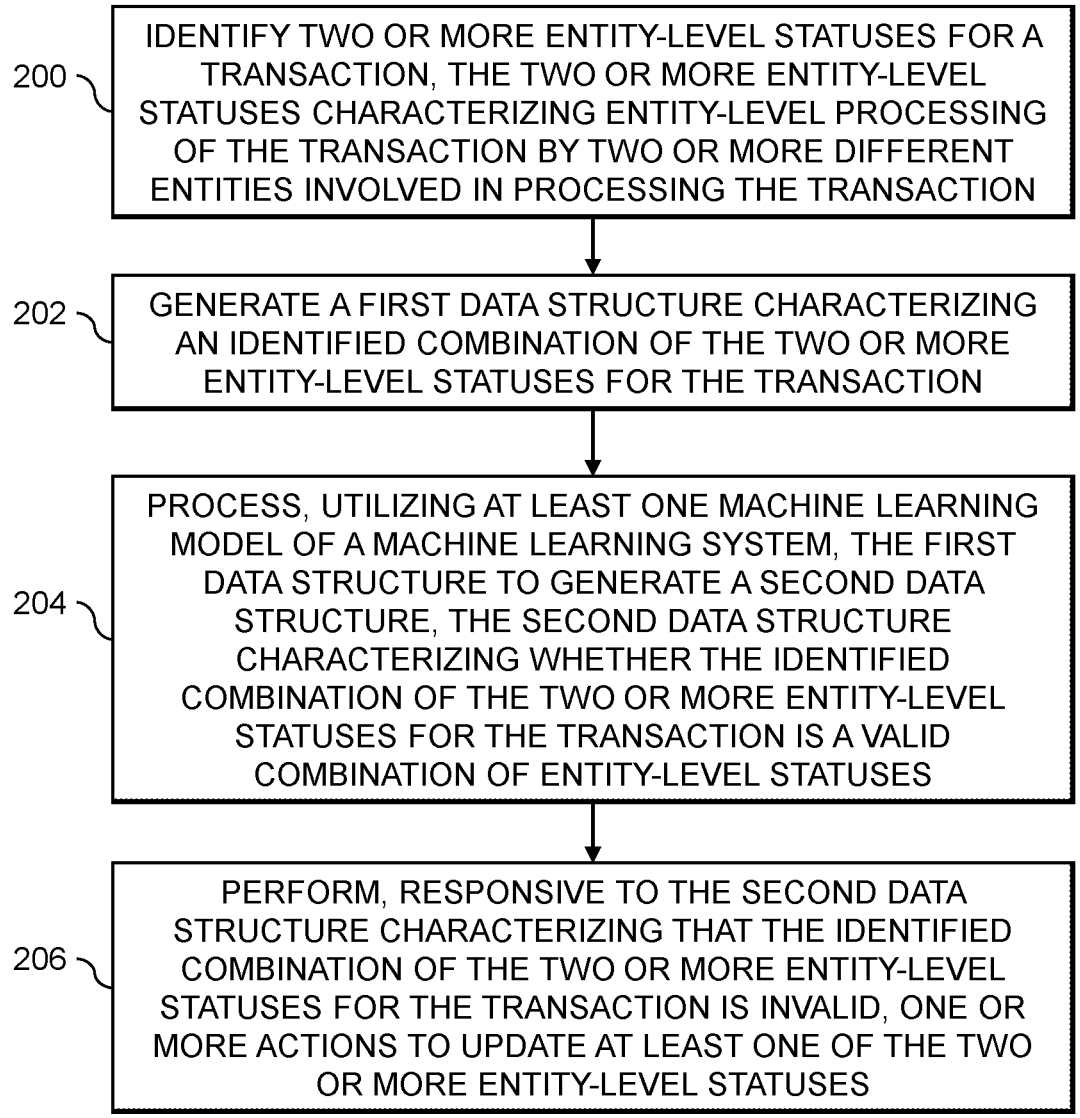
FIG. 2 is a flow diagram of an exemplary process for machine learning-based processing entity status synchronization in an illustrative embodiment.

In some embodiments, the FIG. 2 process further includes updating the at least one machine learning model of the machine learning system responsive to identifying one or more combinations of two or more entity-level statuses characterized as invalid that comprise valid combinations of the two or more entity-level statuses.

In step 206, one or more actions are performed to update at least one of the two or more entity-level statuses responsive to the second data structure characterizing that the identified combination of the two or more entity-level statuses for the transaction is invalid. The transaction may be associated with one or more service level agreements (SLAs) specifying time durations at which the transaction is permitted to remain in different ones of the two or more entity-level statuses. The one or more actions to update the at least one of the two or more entity-level statuses may be proactively performed prior to violation of at least one of the one or more SLAs associated with the at least one of the two or more entity-level statuses.

In some embodiments, the FIG. 2 process further includes, responsive to the second data structure characterizing that the identified combination of the two or more entity-level statuses for the transaction is invalid, generating, utilizing at least one additional machine learning model of the machine learning system, at least one expected value for the at least one of the two or more entity-level statuses. The one or more actions to update the at least one of the two or more entity-level statuses may comprise at least one action to transition the at least one of the two or more entity-level statuses to the at least one expected value for the at least one of the two or more entity-level statuses. The at least one additional machine learning model may comprise a multi-class classification model.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Supply chain management for large organizations is extremely complex. It is also challenging to run a smooth operation across different functional areas or groups of an organization, such as sales, manufacturing, and logistics, due to the huge number of orders getting fulfilled and multiple disruptions in the ecosystem. Amidst the chaos, it is critical to keep a check on the overall order-level status for each order. The overall order-level status for a given order may be based on multiple lower-level statuses (e.g., entity-level statuses) received from different functional areas or groups of an organization (e.g., manufacturing facilities, logistics providers, carriers, internal IT applications, etc.) while the given order gets fulfilled until it reaches the end state of its order lifecycle.

Each organization, or group or functional area thereof, may have its own definition of order statuses. For example, different business units within an organization like sales, logistics, manufacturing, planning, etc. may have different definitions for order statuses. Such different groups or functional areas may monitor order statuses to ensure that orders are on track and are meeting unit-level service level agreements (SLAs). Since order statuses drive revenue recognition and invoicing, the accuracy of order statuses is extremely important. Delayed or advanced order status updates can lead to incorrect financial transactions, status reporting, etc.

Illustrative embodiments provide technical solutions for a proactive order health monitoring framework. The proactive order health monitoring framework may be utilized for an active backlog of orders within an organization. In some embodiments, the proactive order health monitoring framework is leveraged for organizations that use homegrown IT solutions instead of or in addition to enterprise backlog management solutions. The proactive order health monitoring framework provides functionality for detecting orders with inaccurate order statuses (e.g., resulting from functional or IT failures) instantly in real-time. The distressed orders can then be viewed, reported, and actioned for recovery to achieve the rightful state. It should be noted that, in some embodiments, the proactive order health monitoring framework does not rely on SLA-based distressed order analysis where distressed orders are identified based on the orders spending longer than defined SLAs in specific states. The proactive order health monitoring framework, however, may be used within a system that also implements SLA-based distressed order analysis to provide a comprehensive order health monitoring system that can capture various different types of order health issues in an organization. Thus, the technical solutions are able to ensure error-free order status reporting and accurate financial transactions.

In some embodiments, the proactive order health monitoring framework includes functionality for determining order health for an active backlog of orders based on combinations of entity-level statuses reported for various entities (e.g., in a supply chain), where such entities may include IT applications, vendors, carriers, etc., with the rightful or overall order-level status being derived for all the orders in the active backlog (e.g., orders which have not been completed, such as by delivery to a customer or other end-user). The proactive order health monitoring framework also provides functionality for proactive order health analysis, where the orders in the active backlog are proactively analyzed and any discrepancies are published to a support team for review and timely action. The proactive order health monitoring framework is further configured to provide functionality for continuous or periodic relearning, where order profiles which are deemed "incorrect" are reviewed to find new healthy combinations of entity-level statuses.

In some embodiments, the proactive order health monitoring framework is part of a system for order management and is configured to proactively monitor a backlog of active orders to detect distressed orders (e.g., with unhealthy entity-level status combinations). The proactive order health monitoring framework is configured to pass the distressed orders onto reporting interfaces of the order management system for further troubleshooting and recovery. Combinations of entity-level statuses for orders are defined in order to mark orders as healthy or unhealthy (e.g., distressed). The proactive order health monitoring framework is configured to implement continuous or periodic re-learning through reviewing the unhealthy entity-level status combinations (e.g., including "new" entity-level status combinations which are encountered in practice but are not part of the training data) to keep a machine learning system implementing classification algorithms up-to-date. The technical solutions are thus able to resolve issues where one of the entity-level statuses was received from a first entity, while one or more other corresponding entity-level statuses from one or more other entities are missed, generating an invalid combination of entity-level statuses. As discussed above, the proactive order health monitoring framework may be configured to operate alongside SLA-based order health monitoring functionality, to provide a comprehensive order health management system for an organization.

SLA-based order health monitoring functionality is an approach where SLAs are defined for the duration that orders can stay in specific statuses. These SLAs can be set as rules based on descriptive analytics, or can be defined based on predictive models. Any order which "overstays" in a given status (e.g., beyond the defined SLA for the given status) will be flagged and marked as distressed.

The proactive order health monitoring framework provides a technical solution that enables an organization to find orders (e.g., in an active order backlog) that are not in the "right" status based on status notifications or reporting received from downstream or dependent systems (e.g., entity-level status notifications or reporting). This proactive monitoring capability is over and above any SLA-based monitoring solution implemented by the organization. The proactive monitoring capability can help uncover any IT or functional issues that could be impacting the overall order status for an order (e.g., where one of the entity-level statuses was received but another corresponding entity-level status has not been received). The relationships between entity-level statuses are used to perform the proactive monitoring of order health. Entity-level statuses may include, for example: order level status managed by a vendor; shipment or consignment level statuses managed by a vendor; order level status from carriers while handling and carrying shipments for orders; and order level status from internal IT applications while orders are processing.

The proactive order health monitoring framework will proactively check all the entity-level status notifications, and run (e.g., periodically, in response to an explicit request, etc.) an order health analysis for one or more orders based on the entity-level status relationships. This ensures that anomalies and IT issues are caught as soon as they occur (e.g., rather than waiting, for example, for one or more SLA violations). In some embodiments, the order health analysis utilizes a machine learning system that is configured to find whether the combination of entity-level statuses for an order is valid/healthy or not. While performing the health checks for orders, if a new entity-level status combination is found, the proactive order health monitoring framework may initially mark that new entity-level status combination as unhealthy. The proactive order health monitoring framework, however, can re-learn from new entity-level status combinations and course correct in case any new entity-level status combinations are misclassified.

The technical solutions described herein are able to address various technical problems, including the problem of inaccurate overall order-level status resulting from a combination of different entity-level statuses (e.g., when a shipment level status is received but the corresponding overall order level status was missed). Thus, the technical solutions address a need for proactive order-level health tracking solutions, including for organizations that use an assembly of homegrown tools or commercial off-the-shelf (COTS) products to manage a backlog of active orders.

Conventional COTS products, for example, are not able to identify distressed orders in a supply chain ecosystem that uses homegrown solutions instead of, or in conjunction with, enterprise solutions.

The technical solutions described herein are also advantageously able to avoid or reduce the number of inaccurate financial or other transactions and status reporting (e.g., resulting from the overall order-level status being incorrectly set). An organization may drive transactions based on orders moving to specific statuses (e.g., once a specific status is achieved for an order, revenue may be recognized for that order). Any delays or advances in the order status updates can lead to incorrect transactions. Properly executing transactions, including financial transactions, for orders at the correct status can be critical for organizations (e.g., to ensure correct revenue recognition for a fiscal quarter, fiscal year or other reporting period).

Further, the technical solutions provide proactive monitoring such that issues can be identified and addressed even before SLAs are violated (e.g., where SLA-based order health monitoring will only flag orders as distressed after defined SLAs are violated, giving little or no time to course correct). In an SLA-based order health monitoring approach, an organization manually or systematically tracks the health of orders based on the aging SLAs of an order in a status. For example, a business may, based on descriptive learning, determine that an order profile should not spend more than three days on the production line (e.g., an order state of "in production"). If it takes longer than three days for an order to move from the "in production" state to a next order state, that order may be flagged as distressed during order tracking. By this time, however, it is too late for the order to be recovered (e.g., as one or more SLAs have already been violated).

The technical solutions described herein can also eliminate or reduce the reliance on specialized subject matter expert (SME) knowledge in troubleshooting issues related to incorrect order status. In conventional approaches, it is not only difficult to find orders which have problems with the order status, it is also difficult to find the reason for issues. Conventional approaches may rely on SMEs to identify and recover from issues, which is costly, time-consuming and error prone.

In some embodiments, the proactive order health monitoring framework is provided which can solve the supply chain problem of defining or determining whether an order in an active backlog is healthy or unhealthy based on entity-level status indications received from different entities or sources (e.g., logistics providers, manufacturers, carriers, etc.). As discussed above, the proactive order health monitoring framework may be paired with SLA-based order health analysis to provide a comprehensive order health monitoring system. The proactive order health monitoring framework allows for constant re-learning to keep abreast of new changes in the supply chain (e.g., due to addition of new sources, profiles, statuses, combinations of statuses, etc.).

Figure 3:
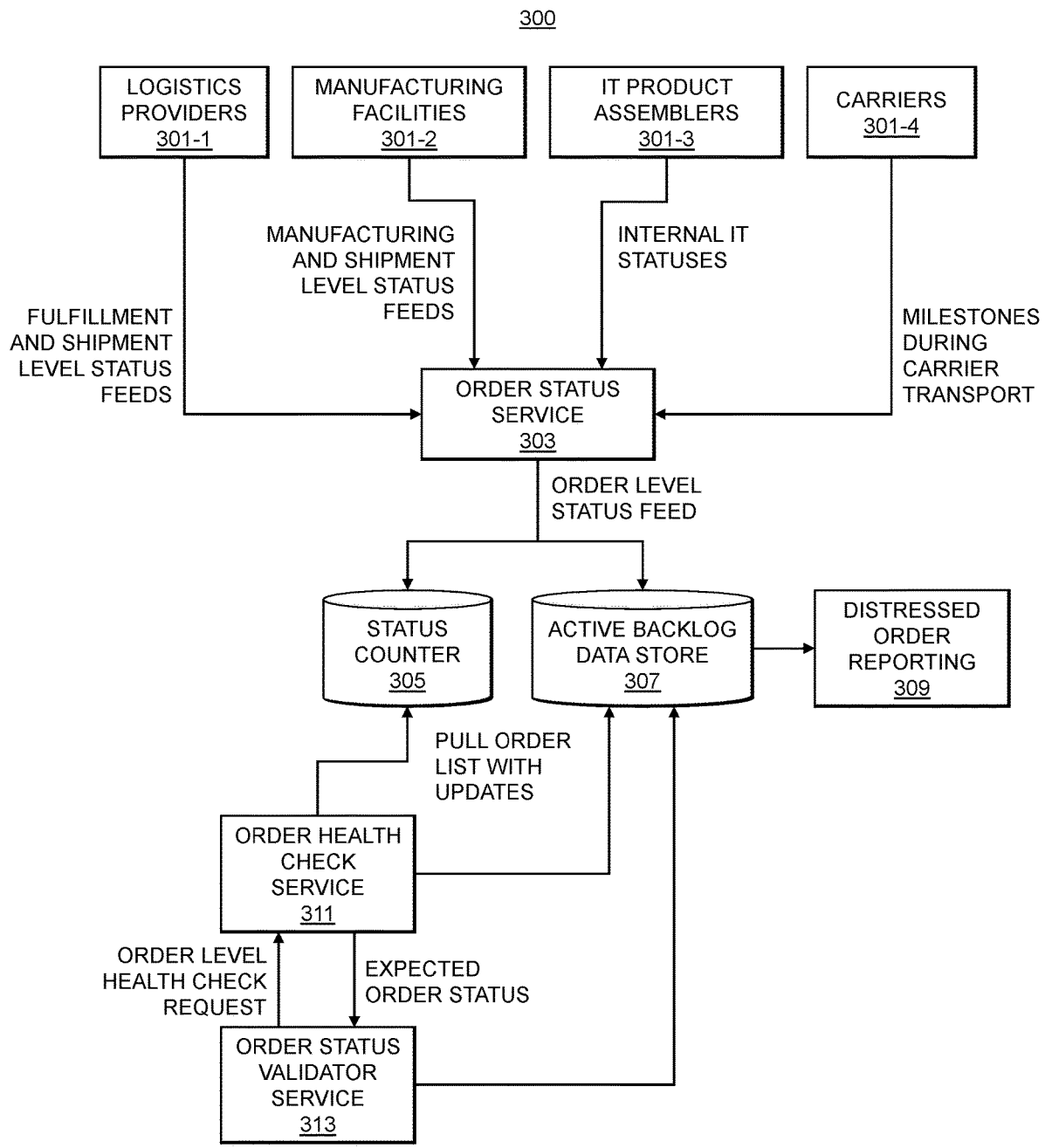
FIG. 3 shows a system implementing a proactive order health monitoring framework in an illustrative embodiment.

FIG. 3 shows a system 300 for implementing a proactive order health monitoring framework. The system 300 includes a set of entities or sources including logistics providers 301-1, manufacturing facilities 301-2, IT product assemblers 301-3 and carriers 301-4 (collectively, sources 301) which feed entity-level status information to an order status service 303. For example, the logistics providers 301-1 provide fulfillment and shipment level status feeds to the order status service 303, the manufacturing facilities 301-2 provide manufacturing and shipment level status feeds to the order status service 303, the IT product assemblers 301-3 provide internal IT statuses to the order status service 303, and the carriers 301-4 provide milestones during carrier transport to the order status service 303. It should be appreciated that the particular sources 301 shown in the system 300 are presented by way of example only, and that various other sources may provide entity-level status notifications or other reporting to the order status service 303 in other embodiments.

The order status service 303 is configured to generate an order-level status feed which is provided to a status counter 305 and an active backlog data store 307. The status counter 305 is configured to record all the latest orders for which statuses have been received from the sources 301. The active backlog data store 307 is configured to maintain the entity-level and order-level statuses for orders in the system 300 for managing an active backlog of orders of one or more organizations. The active backlog data store 307 may be used to generate distressed order reporting 309. An order health check service 311 is configured to pull an order list with updates from the status counter 305, and then runs a health check for orders in the list based on information from the active backlog data store 307 (e.g., entity-level status combinations from the sources 301, the order-level statuses, etc.). An order status validator service 313 may trigger or request the order health check service 311 to perform order level health checks, with the order health check service 311 returning expected order statuses for the orders. The order status validator service 313 is configured to mark orders as healthy or unhealthy accordingly based on the expected order status. The order status validator service 313 may update the active backlog data store 307 to mark orders as healthy or unhealthy, with unhealthy orders in the active backlog data store 307 triggering the distressed order reporting 309.

Various use case scenarios will now be described, where entity-level statuses used to track the overall order health include:

Status_1: highest level order status, where the order lifecycle is measured based on this status along with Status_2. Sample values for Status_1 include PP (pre-production), IP (in-production), SC (scan complete), MN (manifested), IN (invoiced), etc.

Status_2: subset of the order level status which defines the substages in the order lifecycle. Sample values for Status_2 include started, acknowledged, etc.

Status_3: statuses maintained by a vendor (e.g., manufacturing or logistics) while fulfilling an order. Sample values for Status_3 include 3000 (order acknowledged by manufacturing vendor), 4000 (started production), 8000 (shipment notification (SN) sent by vendors to IT to notify that products have been shipped), 8050 (transport complete (TC) trigger sent by vendor when the carrier acknowledges receiving goods from the vendor), etc. For orders with the Status_3 value equal to 9200 (hold), a last previously reported status is used (e.g., as the code 9200 means hold, which can occur at any stage throughout fulfillment of the order and may cause bias in the data).

Status_4: shipment statuses from the vendor and IT systems, which define vendor readiness of shipping orders.

Status_5: shipment milestone statuses from the carrier.

Consider an order in the active backlog data store 307 that is marked by the status counter 305 as new. This order is then polled by the order health check service 311 and passed further to the order status validator service 313. The order status validator service 313 pulls all necessary data, such as order-level and entity-level statuses, order type or profile, etc., for use in a classification algorithm to predict entity-level status values (e.g., the Status_1 and Status_2 values) for the order. The predicted values for Status_1 and Status_2 are then compared to the actual status values for the order. If the predicted statuses match the actual order and/or entity-level statuses, then the order gets marked as healthy. If the predicted statues do not match the actual order and/or entity-level statuses, then the order gets marked as unhealthy. FIG. 4 shows a table 400 of values for a healthy order, and a table 405 of values for an unhealthy order. The order health and expected entity-level statuses determined by the order status validator service 313 are pushed to the active backlog data store 307. For healthy orders, the health field is marked as "Y" while for unhealthy orders the health field is marked as "N". The health flag gets pushed to the active backlog data store 307 together with the expected combination of entity-level status values. This enables the distressed order reporting 309, allowing users to quickly view distressed orders and the expected statuses that the distressed orders should be mapped to.

On receiving entity-level statuses from the sources 301, the order status service 303 is configured to update the status counter 305 and the active backlog data store 307. For example, on receiving order level or shipment level status information for a given order, the order status service 303 can update the Status_1 and Status_2 values in the active backlog data store 307 for the given order. The active backlog data store 307 maintains information for orders that are not completed and still need monitoring. The status counter 305 may be implemented as a lightweight database layer which holds the list of recently updated orders, until a job run periodically by the order health check service 311 reads the details. The order health check service 311 periodically polls the status counter 305 to get a list of updated orders. For each of the updated orders, a call is made to the order status validator service 313 to determine an expected status (e.g., as output from one or more machine learning models of a machine learning system implemented by the order status validator service 313) and health (e.g., Y for healthy and N for unhealthy profiles).

Figure 5:
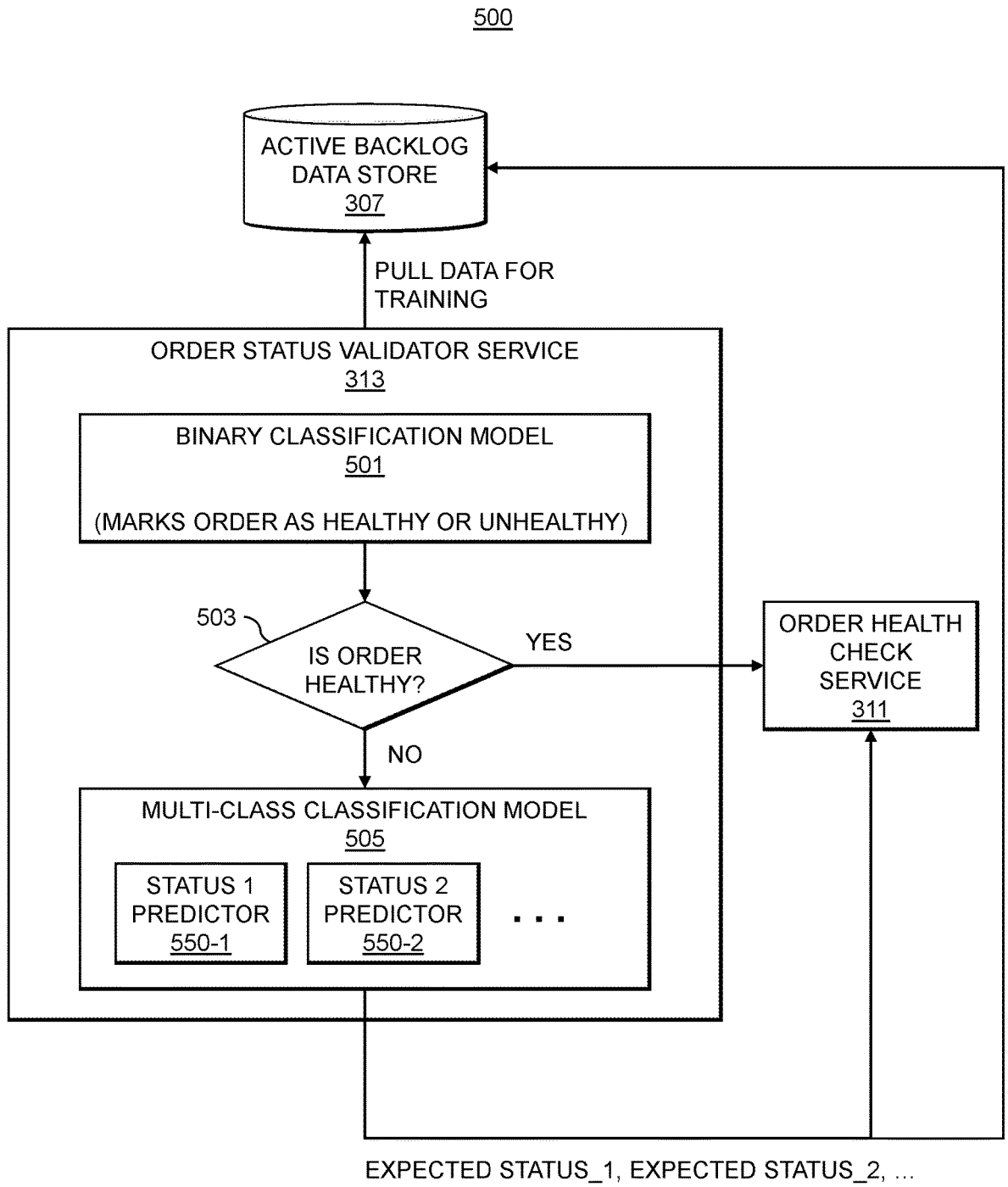
FIG. 5 shows an order status validation service of a proactive order health monitoring framework in an illustrative embodiment.

FIG. 5 shows a detailed view of a system 500 implementing the order health check service 311 and the order status validator service 313, which is configured to predict the expected status for unhealthy combinations of entity-level statuses (e.g., which, in a conventional approach, would require SME knowledge and significant cost, time and error-prone manual effort). The order status validator service 313 is configured to mark an order as healthy if the actual order and entity-level statuses are the same as predicted. If not, the order is marked as unhealthy. The order status validator service 313 may re-train machine learning models used for such predictions (e.g., based on new entity-level status combinations which are introduced into the ecosystem).

The order status validator service 313, as shown in FIG. 5, implements a binary classification model 501 that is configured to determine if a combination of entity-level statuses reported for a given order is healthy (e.g., allowed in a particular system) or unhealthy (e.g., not allowed in a particular system). This is a classification problem, and the binary classification 5 model 501 may utilize a machine learning algorithm that predicts an expected combination of entity-level statuses (e.g., combinations of Status 1 and Status 2 values) based on order characteristics. To get the training dataset for the binary classification model 501, data from the active backlog data store 307 may be pulled at different times to ensure capture of as many combinations of entity-level statuses as possible. Next, duplicates are dropped until only unique combinations of entity-level statuses remain, which are manually corrected (e.g., by leveraging SME knowledge) and prepared for model training of the binary classification model 501. In some embodiments, dummy encoding is used for the training dataset because all the variables, such as order and entity-level statuses, order types or profiles, etc. are categorical. The binary classification model 501 may implement or utilize various supervised machine learning classification algorithms.

In some embodiments, the binary classification model 501 utilizes a Random Forest classifier with Gini criterion. The Random Forest classifier is a meta-estimator that fits several decision tree classifiers on various sub-samples of the dataset and uses averaging to improve the predictive accuracy and control overfitting. The Random Forest classifier may thus be considered as a mixture of multiple decision tree models, which can be described as a non-parametric supervised machine learning method used for classification and regression. The goal is to create a model that predicts the value of a target variable by learning simple decision rules inferred from the data features. However, a single decision tree may not be enough to capture complex rules, such as is the case with entity-level status combinations for orders. The Random Forest classifier is both accurate and fast. The Random Forest classifier predictions may be tested in multiple ways. For example, the binary classification model 501 implementing a Random Forest classifier machine learning algorithm may be trained on a small sample (e.g., 50 unique combinations of order and entity-level statuses) which are manually corrected in the case of unhealthy combinations. Next, this model is used to predict 50,000 orders in the bulk data extracted from the active backlog data store 307. The algorithm was able to learn all the combinations perfectly, and no orders were misclassified according to the confusion matrix. After this, a second test of multiple smaller pulls of data from the active backlog data store 307 at different times is performed. If the Random Forest classifier accuracy remains qualitatively the same or similar, the model is ready for deployment and use.

In block 503, the order status validator service 313 is configured to determine whether a given order is healthy or not based on the output of the binary classification model 501. This is done, for example, by comparing the predicted order-level status to the actual order-level status for the given order. If the predicted and actual order-level statuses are the same, then the given order is marked as healthy. If the predicted and actual order-level statuses differ, the given order is marked as unhealthy and is processed utilizing multi-class classification model 505, which implements a set of predictors that generate predictions for individual entity-level statuses for the given order. The multi-class classification model 505 may implement various different machine learning models or algorithms. As shown in FIG. 5, the multi-class classification model 505 implements a Status 1 predictor 550-1, a Status 2 predictor 550-2, etc. (collectively, entity-level status predictors 550) The expected entity-level status values (e.g., for Status 1, Status, 2, etc.) output by the entity-level status predictors 550 are provided to the order health check service 311 and/or the active backlog data store 307 (e.g., for use in distressed order reporting 309). The binary classification model 501 and the multi-class classification model 505 may be subject to "re-learning" or updated training. As discussed above, new entity-level status combinations that are not used for training may initially be marked as unhealthy and kept aside for review (e.g., by a SME). If any of the new entity-level status combinations are found to be healthy, they will be marked healthy during re-training of the binary classification model 501 and the multi-class classification model 505.

Figure 6:
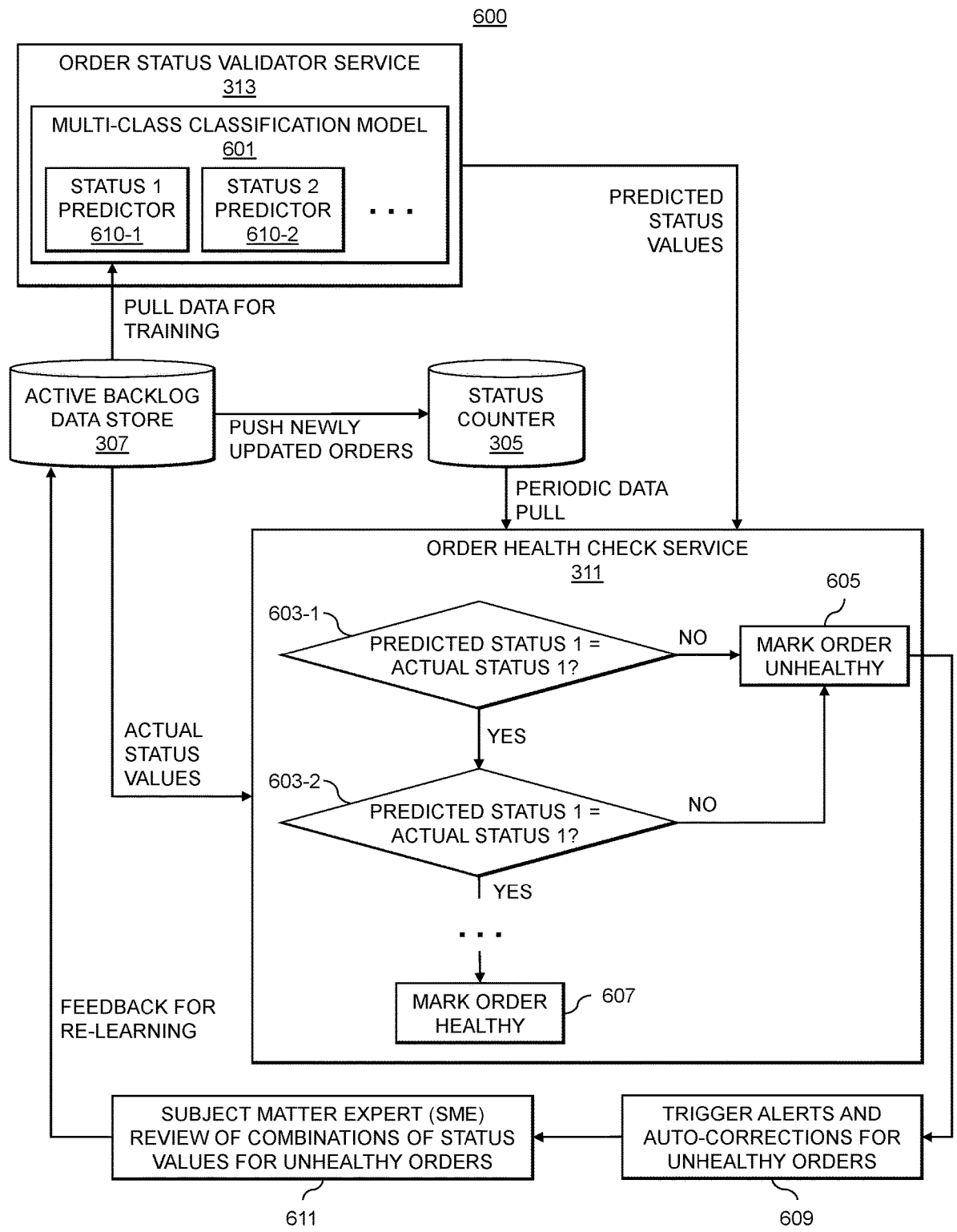
FIG. 6 shows another order status validation service of a proactive order health monitoring framework in an illustrative embodiment.

FIG. 6 shows another detailed view of a system 600 implementing the order health check service 311 and the order status validator service 313. Whereas in the system 500 the order status validator service 313 implements both the binary classification model 501 and the multi-class classification model 505, in the system 600 the order status validator service 313 implements just a multi-class classification model 601. The multi-class classification model 601, similar to the multi-class classification model 505, implements a Status 1 predictor 610-1, a Status 2 predictor 610-2, etc. (collectively, entity-level status predictors 610). The multi-class classification model 601 predicts different entity-level status values for an order, which in a conventional approach would require SME knowledge. The multi-class classification model 601 may pull data from the active backlog data store 307 for training (and retraining, based on feedback from SMEs regarding combinations of entity-level status values associated with unhealthy orders).

The order health check service 311 periodically polls the status counter 305 to get a list of updated orders (which may be pushed from the active backlog data store 307 to the status counter 305). For each order in the list of updated orders, the order health check service 311 pulls predicted entity-level status values from the order status validator service 313, and pulls actual entity-level status values from the active backlog data store 307. The order health check service 311 compares the predicted and actual entity-level status values (e.g., blocks 603-1, 603-2, etc.) in order to determine whether a given order is healthy or unhealthy. If any of the predicted entity-level status values differ from the actual entity-level status values, the given order is marked as unhealthy in block 605. If the predicted and actual entity-level status values are the same, the given order is marked as healthy in block 607. The unhealthy orders are pushed to alerting systems in block 607, where alerts and auto-corrections are triggered for the unhealthy orders. In block 609, a SME reviews the combinations of entity-level status values for the unhealthy orders (e.g., to determine if any are incorrectly labeled as unhealthy), and generates feedback for re-learning which is pushed to the active backlog data store 307 and/or the order status validator service 313.

The technical solutions described herein provide functionality for proactively monitoring order health based on analysis of entity-level status reporting in order to identify distressed orders for which an order-level status has not been correctly updated. Such distressed orders can be identified without delay (e.g., without waiting for SLA-based monitoring where an SLA needs to be passed before a discrepancy in an order-level status is identified). Further, the technical solutions are advantageously able to capture entity-level status combinations which cannot be predicted (e.g., which were not part of a training data set) and which are initially marked as unhealthy in order to perform re-learning or re-training of classifiers.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based processing entity status synchronization will now be described in greater detail with reference to FIGS. 7 and 8. Although described in the context of system 100, these platforms may also be used to implement at least portions of other information processing systems in other embodiments.

Figure 7:
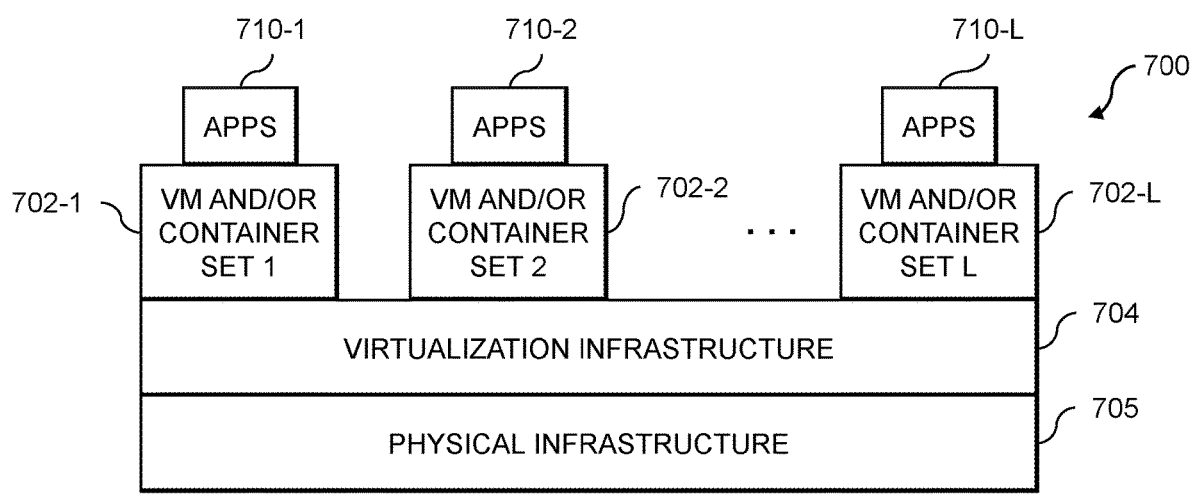
FIGS. 7 and 8 show examples of processing platforms that may be utilized to implement at least a portion of an information processing system in illustrative embodiments.
Figure 8:
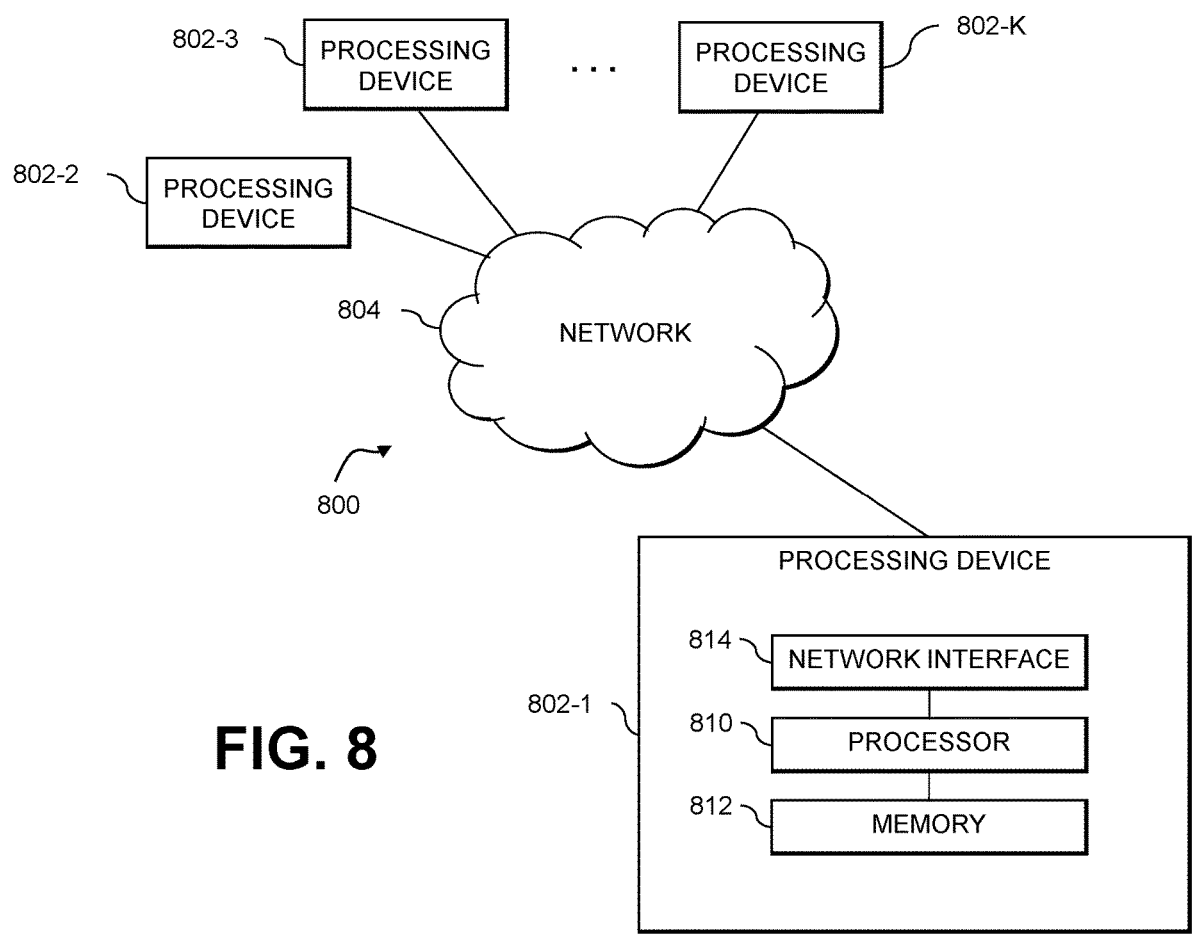

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based processing entity status synchronization as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computing devices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured:
        to identify two or more entity-level statuses for a transaction, the two or more entity-level statuses characterizing entity-level processing of the transaction by two or more different entities involved in processing the transaction;
        to generate a first data structure characterizing an identified combination of the two or more entity-level statuses for the transaction;
        to process, utilizing at least one machine learning model of a machine learning system, the first data structure to generate a second data structure, the second data structure characterizing whether the identified combination of the two or more entity-level statuses for the transaction is a valid combination of entity-level statuses; and
        to perform, responsive to the second data structure characterizing that the identified combination of the two or more entity-level statuses for the transaction is invalid, one or more actions to update at least one of the two or more entity-level statuses.

2. The apparatus of claim 1 wherein the two or more different entities involved in processing the transaction are associated with different supply chain entities in a supply chain.

3. The apparatus of claim 1 wherein the transaction comprises an order for one or more information technology products, and wherein the two or more different entities involved in processing the transaction comprise at least two of:
    one or more manufacturing facilities;
    one or more product assemblers;
    one or more logistic providers; and
    one or more carriers.

4. The apparatus of claim 1 wherein the two or more different entities involved in processing the transaction comprise (i) a first set of one or more information technology applications operated by a first one of the two or more different entities involved in processing the transaction and (ii) one or more additional information technology applications operated by one or more additional ones of the two or more different entities involved in processing the transaction which report entity-level status information to the first set of one or more information technology applications.

5. The apparatus of claim 1 wherein the at least one machine learning model of the machine learning system comprises a binary classification model.

6. The apparatus of claim 5 wherein processing the first data structure to generate the second data structure comprises generating an expected combination of the two or more entity-level statuses for the transaction based at least in part on one or more characteristics of the transaction, the second data structure indicating whether the expected combination of the two or more entity-level statuses for the transaction matches the identified combination of the two or more entity-level statuses for the transaction.

7. The apparatus of claim 6 wherein the one or more characteristics of the transaction comprise an overall status level for the transaction and a transaction type of the transaction.

8. The apparatus of claim 5 wherein the binary classification model comprises a Random Forest classifier.

9. The apparatus of claim 1 wherein the at least one processing device is further configured, responsive to the second data structure characterizing that the identified combination of the two or more entity-level statuses for the transaction is invalid, to generate, utilizing at least one additional machine learning model of the machine learning system, at least one expected value for said at least one of the two or more entity-level statuses.

10. The apparatus of claim 9 wherein the one or more actions to update said at least one of the two or more entity-level statuses comprise at least one action to transition said at least one of the two or more entity-level statuses to said at least one expected value.

11. The apparatus of claim 9 wherein the at least one additional machine learning model comprises a multi-class classification model.

12. The apparatus of claim 1 wherein the at least one processing device is configured to update the at least one machine learning model of the machine learning system responsive to identifying one or more combinations of two or more entity-level statuses characterized as invalid that comprise valid combinations of the two or more entity-level statuses.

13. The apparatus of claim 1 wherein the transaction is associated with one or more service level agreements specifying time durations at which the transaction is permitted to remain in different ones of the two or more entity-level statuses.

14. The apparatus of claim 13 wherein the one or more actions to update said at least one of the two or more entity-level statuses are proactively performed prior to violation of at least one of the one or more service level agreements associated with said at least one of the two or more entity-level statuses.

15. A computer program product comprising a non-transitory processor-readable storage medium having stored therein program code of one or more software programs, wherein the program code when executed by at least one processing device causes the at least one processing device:
to identify two or more entity-level statuses for a transaction, the two or more entity-level statuses characterizing entity-level processing of the transaction by two or more different entities involved in processing the transaction;
to generate a first data structure characterizing an identified combination of the two or more entity-level statuses for the transaction;
to process, utilizing at least one machine learning model of a machine learning system, the first data structure to generate a second data structure, the second data structure characterizing whether the identified combination of the two or more entity-level statuses for the transaction is a valid combination of entity-level statuses; and
to perform, responsive to the second data structure characterizing that the identified combination of the two or more entity-level statuses for the transaction is invalid, one or more actions to update at least one of the two or more entity-level statuses.

16. The computer program product of claim 15 wherein the program code when executed by the at least one processing device further causes the at least one processing device, responsive to the second data structure characterizing that the identified combination of the two or more entity-level statuses for the transaction is invalid, to generate, utilizing at least one additional machine learning model of the machine learning system, at least one expected value for said at least one of the two or more entity-level statuses, wherein the one or more actions to update said at least one of the two or more entity-level statuses comprise at least one action to transition said at least one of the two or more entity-level statuses to said at least one expected value.

17. The computer program product of claim 15 wherein the transaction is associated with one or more service level agreements specifying time durations at which the transaction is permitted to remain in different ones of the two or more entity-level statuses, and wherein the one or more actions to update said at least one of the two or more entity-level statuses are proactively performed prior to violation of at least one of the one or more service level agreements associated with said at least one of the two or more entity-level statuses.

18. A method comprising:
identifying two or more entity-level statuses for a transaction, the two or more entity-level statuses characterizing entity-level processing of the transaction by two or more different entities involved in processing the transaction;
generating a first data structure characterizing an identified combination of the two or more entity-level statuses for the transaction;
processing, utilizing at least one machine learning model of a machine learning system, the first data structure to generate a second data structure, the second data structure characterizing whether the identified combination of the two or more entity-level statuses for the transaction is a valid combination of entity-level statuses; and
performing, responsive to the second data structure characterizing that the identified combination of the two or more entity-level statuses for the transaction is invalid, one or more actions to update at least one of the two or more entity-level statuses;
wherein the method is performed by at least one processing device comprising a processor coupled to a memory.

19. The method of claim 18 further comprising, responsive to the second data structure characterizing that the identified combination of the two or more entity-level statuses for the transaction is invalid, generating, utilizing at least one additional machine learning model of the machine learning system, at least one expected value for said at least one of the two or more entity-level statuses, wherein the one or more actions to update said at least one of the two or more entity-level statuses comprise at least one action to transition said at least one of the two or more entity-level statuses to said at least one expected value.

20. The method of claim 18 wherein the transaction is associated with one or more service level agreements specifying time durations at which the transaction is permitted to remain in different ones of the two or more entity-level statuses, and wherein the one or more actions to update said at least one of the two or more entity-level statuses are proactively performed prior to violation of at least one of the one or more service level agreements associated with said at least one of the two or more entity-level statuses.

* * * * *